(12) United States Patent
Wang et al.

(10) Patent No.: US 7,867,952 B2
(45) Date of Patent: Jan. 11, 2011

(54) FLEXIBLE POLYMER, PARTICLES PREPARED THEREFROM AND PROCESS FOR PREPARING THE SAME

(75) Inventors: Pingmei Wang, Beijing (CN); Jianhui Luo, Beijing (CN); Yuzhang Liu, Beijing (CN); Huaijiang Zhu, Beijing (CN); Chunming Xiong, Beijing (CN); Qiang Liu, Beijing (CN); Ruyi Jiang, Beijing (CN); Yikun Li, Beijing (CN); Ying Zhang, Beijing (CN)

(73) Assignee: Petrochina Company Limited, Beijing (CN)

(*) Notice: Subject to any disclaimer, the term of this patent is extended or adjusted under 35 U.S.C. 154(b) by 369 days.

(21) Appl. No.: 12/001,956

(22) Filed: Dec. 12, 2007

(65) Prior Publication Data

US 2008/0139413 A1 Jun. 12, 2008

(30) Foreign Application Priority Data

Dec. 12, 2006 (CN) .................... 2006 1 0165008

(51) Int. Cl.
*C07C 43/00* (2006.01)
(52) U.S. Cl. .................... 507/231; 568/607; 568/611
(58) Field of Classification Search ............. 507/231; 568/607, 611
See application file for complete search history.

(56) References Cited

U.S. PATENT DOCUMENTS

| | | | | |
|---|---|---|---|---|
| 4,029,872 A | * | 6/1977 | Evani et al. | 526/307.5 |
| 4,151,341 A | * | 4/1979 | Lalk et al. | 524/549 |
| 4,360,061 A | * | 11/1982 | Canter et al. | 166/270.1 |
| 4,787,451 A | | 11/1988 | Mitchell | |
| 2002/0045703 A1 | * | 4/2002 | Bassett et al. | 524/804 |

FOREIGN PATENT DOCUMENTS

| | | |
|---|---|---|
| CN | 98120664.6 | 5/2000 |
| CN | 00103532.0 | 12/2003 |
| CN | 00100888.9 | 12/2004 |

* cited by examiner

*Primary Examiner*—Randy Gulakowski
*Assistant Examiner*—Alicia M Toscano
(74) *Attorney, Agent, or Firm*—Cohen Pontani Lieberman & Pavane LLP

(57) ABSTRACT

Disclosed are a flexible polymer, particles made from same, and a process for preparing the particles. This flexible polymer is obtained from copolymerizing monomer (A) and monomer (B), wherein monomer (A) is one or more water-insoluble unsaturated diene monomers; monomer (B) is at least one compound with the general formula of

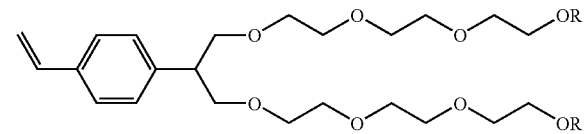

wherein R is $C_1$-$C_{12}$ alkyl, $C_1$-$C_{12}$ alkyl aryl, $C_1$-$C_{12}$ alkyl ether or $C_1$-$C_{12}$ alkyl ester. Monomer (A) is in an amount of 60-90% by weight of the total combined weight of monomer (A) and monomer (B). Monomer (B) is in an amount of 10-40% by weight of the total combined weight of monomer (A) and monomer (B). The flexible polymer particles show excellent flexibility, deformability, elasticity as well as stability. They can be used in oilfields in nearby wellbore profile control and in-depth profile control or as in-depth flooding fluid diverting agents. They can also be applied in water shutoff in high temperature and high salinity production wells; preventing chemical channeling in polymer and ASP (alkali-surfactant-polymer) flooding; temporarily plugging in acidization; huff and puff; and preventing in-depth channeling in steam flooding, loss of circulation control and filtration control, and the like.

8 Claims, No Drawings

FLEXIBLE POLYMER, PARTICLES PREPARED THEREFROM AND PROCESS FOR PREPARING THE SAME

FIELD OF THE INVENTION

The present invention relates to flexible polymer particles used in oilfields. Specifically, this invention relates to the use of such particles in nearby wellbore profile control, in-depth profile control as well as in-depth flooding fluid diversion in oilfields. The invention also relates to a process for preparing the flexible polymer particles. The flexible polymer particles of the invention can also be applied in water shutoff in high temperature and high salinity production wells; preventing chemical channeling in polymer and ASP (alkali-surfactant-polymer) flooding; temporarily plugging in acidization; huff and puff; and preventing in-depth channeling in steam flooding, loss of circulation control and filtration control, and the like.

BACKGROUND OF THE INVENTION

In high water cut and extra high water cut exploitation periods, water flooding in huge amounts is necessary for stabilizing oil yields. Long-term water flooding leads to channeling through large passages, so the injection water cycles with very low efficiency result in increased costs of oil recovery. Consequently, effective water flooding has become one of the most important measures for the exploitation of high water cut and extra high water cut oilfields at low cost.

From laboratory studies and field tests over the years, it has been realized that water flooding itself can result in fairly high displacement efficiency, and that the key to further improving the recovery effect by water flooding is to improve water sweep efficiency. The principle problem of anaphase of the high water cut period is the futile cycle of injection water due to the initial heterogeneity of the oil reservoir and the "aggravating heterogeneity" caused by long-term water flooding. To solve the problem, it is not pragmatic to thoroughly infill the well pattern or to largely improve the water intake per unit thickness. Only by reforming the set streamline field formed by long-term water flooding to transfer the injection water to low-permeability zones with low sweeping efficiency can one control the huge futile cycle of the injection water through high permeability zones with high sweep efficiency.

Owing to the complexity of high water cut anaphase in an oil reservoir, especially when "large passages" have appeared in the oil reservoir, studying the distribution of residual oil has no practical guiding significance on the effective improvement of waterflooding sweep volume. Current technologies of profile control and in-depth profile control can only solve the water-channeling problem in nearby wellbore zones and cannot provide a satisfactory answer for the water channeling problem in in-depth areas of a reservoir. Studies should be concentrated on the flowing direction and velocity of water (namely, the present streamline field of water in the oil reservoir), to acquire the current situation and streamline field of water flooding. Based on the current understanding of water flooding (e.g. streamline distribution) in a reservoir, the streamline field may be reformed by developing new methods and effective technologies for the diversion of injection water in in-depth areas of a reservoir to efficiently increase the waterflooding sweep volume. What is critical is to develop a new in-depth diverting agent, rather than a profile-controlling agent.

Much prior art exists regarding the realization of in-depth flooding fluid diversion. U.S. Pat. No. 4,787,451 and Chinese Patent Application No. 00103532.0 disclose in-depth flooding fluid diversion using an underground cross-linking weak gel system with acrylamide polymer as the main material. Chinese Patent Application No. 00100888.9 discloses in-depth flooding fluid diversion using an underground cross-linking colloidal dispersion gel system with acrylamide polymer as the main material. Chinese Patent Application No. 98120664.6 discloses in-depth flooding fluid diversion by using a pre-cross linking swellable particle system with acrylamide polymer as the main material. In recent years, the in-depth flooding fluid diversion technology with the adoption of aforesaid systems has yielded certain results in raising the water flooding efficiency, and has become a useful measure of the improvement of exploitation reserves and enhanced oil recovery.

However, as is known, acrylamide may be hydrolyzed and produce acrylic acid (acrylate) under certain temperatures or in acid and alkaline conditions. The polymerizing reaction for preparing acrylamide polymer from acrylamide as the main material is exothermic, and will generate a large amount of heat. The reaction heat cannot be released since the generated acrylamide polymer transforms the reaction system promptly into a gel phase, leading to the rapid increase of the reaction system temperature. As a result, the acrylamide polymer product is, in essence, the copolymer of acrylamide and acrylic acid (acrylate). In fresh water, because of the electric mutual repulsion between the carboxyl sodium groups within the acrylamide polymer molecules, the acrylamide polymer molecules are in an extending state and have a strong viscosity-increasing ability. In brine, because the electric property of the carboxy sodium groups within the acrylamide polymer molecules is shielded, the acrylamide polymer molecules are in a curling state. The higher the degree of hydrolysis (i.e., the higher the content of carboxy sodium groups), the more the acrylamide polymer molecules curl in brine and the lower the polymer's viscosity increasing ability will be. Hydrolysis reactions will occur continuously in acrylamide polymer molecules under stratum temperature. When the degree of hydrolysis of acrylamide polymer is $\geq 40\%$, no precipitant will appear even for the serious curling of the acrylamide polymer molecules and the great reduction of its viscosifying ability. However, in hard water (i.e., high $Ca^{2+}$ and/or $Mg^{2+}$ content), when the hydrolysis degree of acrylamide polymer is $\geq 40\%$, flocculant precipitants will appear because the acrylamide polymer molecules combine with multiple valence ions such as $Ca^{2+}$ and $Mg^{2+}$.

The four above-mentioned patents all teach employing acrylamide polymer as a major material without teaching long-term stability regarding the properties of the raw material. Additionally, the placement of an in-depth flooding fluid-diverting agent is a technology for allowing the in-depth flooding fluid diverting agent to get into in-depth positions where "large passages" or high permeability zones exist in reservoirs. Analyzed from the aspect of placement technology, when an underground cross-linking placement technology is employed, an optimized cross-linking condition in ground design cannot be accomplished completely, and great risk will result in reaching successful cross-linking underground. This is because the pH, salinity and temperature of the stratum all influence the cross-linking system, the hydrolysis degree varies constantly, and adsorption and retention of the polymer on the surface of stratum also affect the valid frontier concentration of the polymer and the chromatographic separation of the cross-linking system by the stratum. Also, the effective distance of underground cross-linking placement technology is restrained for the reason that effective gelation time cannot be delayed for very long. Furthermore, it is difficult for the underground cross-linking system to meet the needs of in-depth flooding fluid diversion, for it either hardly deforms with high strength or is crushed with low strength. In the ground cross-linking placing technology, the adsorption and wall-holding ability of gel is low after interaction between the absorbing groups, which leads to weaker transporting resistance through "large passages", and thus the ability of in-depth flooding fluid diversion is compromised. Moreover, the same problems as in the underground cross-linking system also exist in this system. In a word, these systems exhibit drawbacks of low deformation ability, being unable to resist heat or salt and having no long-term stability etc., and these drawbacks affect the implementation and economic benefits of in-depth flooding fluid diversion technology.

Accordingly, there exists a need for a new in-depth flooding fluid diverting agent with strong deformation ability, resistance to temperature and salt, and long-term stability.

SUMMARY OF THE INVENTION

One object of the invention is to prepare flexible polymer particles with strong deformation ability, with resistance to heat and salt, and long-term stability. Under conditions higher than critical pressure differential, such flexible polymer particles are able to adapt to pore changes in the stratum of an oilfield and pass through the porous throat by self-deformation. Under conditions lower than critical pressure differential, they are also able to adapt to pore changes in the stratum of an oilfield and block the stratum throat by self-deformation. When the particle diameter is smaller than the pores, the flexible polymer particles are able to stagnate and accumulate (by adsorption and certain adherence mechanism), to block the porous medium and force the injection water to change direction, thus improving sweep efficiency. When the particle diameter is larger than the pores, the flexible polymer particles are able to migrate (by extrusion and deformation) within a porous medium if the flow pressure field is higher than the critical pressure differential. In this way, in-depth flooding fluid diversion is achieved.

The present invention provides a flexible polymer prepared from copolymerization of a monomer (A) and a monomer (B), wherein (i) the monomer (A) is one or more of water-insoluble unsaturated diene monomers; and (ii) the monomer (B) is at least one compound with the general formula of

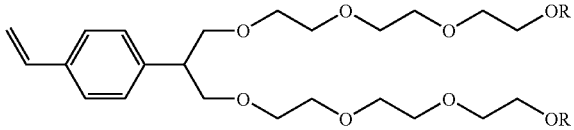

In one embodiment, the monomer (A) is selected from the group consisting of cis-butadiene, isobutene, diallyl diethyl malonate, diallyl phthalate, diallyl fumarate, diallyl isophthalate, diallyl maleate, diallyl tetrabromophthalate, and any mixture of the aforesaid compounds. In another embodiment, in the general formula of the monomer (B), R is $C_1$-$C_{12}$ alkyl, $C_1$-$C_{12}$alkyl aryl, $C_1$-$C_{12}$alkyl ether or $C_1$-$C_{12}$ alkyl ester.

In the instant polymer, (i) the monomer (A) is in an amount of 60-90% by weight of the total weight of the monomer (A) and the monomer (B), preferably 70-80% by weight, and (ii) the monomer (B) is in an amount of 10-40% by weight of the total weight of the monomer (A) and the monomer (B), preferably 20-30% by weight. Additionally, each monomer (A) in the polymer can be the same as or different than the other monomers (A) in the polymer. Likewise, each monomer (B) in the polymer can be the same as or different than the other monomers (B) in the polymer.

Initiators that can be used in the polymerization reaction of the present invention can be any initiators taught in the prior art. The polymerization method employed in the present invention is preferably bulk polymerization as adopted in the prior art. The monomer (A) and the monomer (B) are added, for example, in proportion into a kneader, wherein the temperature is raised to 75-140° C. with agitation at the same time. Then 0.1-5 weight % of dibenzoyl peroxide is added in to initiate polymerization and cross-linking, thereby producing a flexible polymer colloid. The produced flexible polymer colloid is extruded into a pelletizer and the generated flexible polymer particles are directly added into 1-15° C. cold water for the quick termination of polymerization and cross-linking reaction, thereby obtaining the flexible polymer particles with content of about 50%.

An embodiment of the present invention relates to a flexible polymer, characterized in that the flexible polymer is obtained from copolymerization of a monomer (A) and a monomer (B), wherein the monomer (A) represents one or more of water-insoluble unsaturated diene monomers; the monomer (B) represents at least one compound with the general formula of

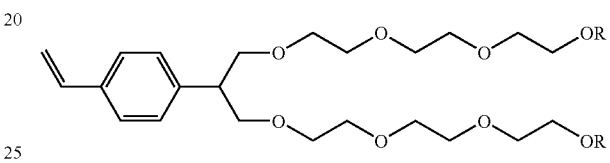

wherein R indicates $C_1$-$C_{12}$ alkyl, $C_1$-$C_{12}$alkyl aryl, $C_1$-$C_{12}$alkyl ether or $C_1$-$C_{12}$ alkyl ester. The monomer (A) is in an amount of 60-90% by weight of the total weight of the monomer (A) and the monomer (B), preferably 70-80% by weight of the total weight of the monomer (A) and the monomer (B). The monomer (B) is in an amount of 10-40% by weight of the total weight of the monomer (A) and the monomer (B).

Preferably, the monomer (A) is selected from the group consisting of cis-butadiene, isobutene, diallyl diethyl malonate, diallyl phthalate, diallyl fumarate, diallyl isophthalate, diallyl maleate, diallyl tetrabromophthalate, and any mixture thereof. In a preferable embodiment, said flexible polymer is in the form of particles.

In a further aspect, the present invention provides a process for the preparation of flexible polymer particles, comprising:

adding 60-90% by weight of the monomer (A) and 10-40% by weight of the monomer (B) into a kneader to form a mixture based on the total weight of a monomer (A) and a monomer (B), wherein the monomer (A) is one or more of water-insoluble unsaturated diene monomers; the monomer (B) is at least one compound with the general formula of

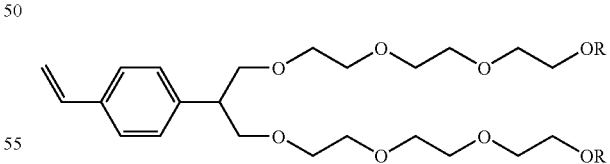

wherein R is $C_1$-$C_{12}$ alkyl, $C_1$-$C_{12}$alkyl aryl, $C_1$-$C_{12}$alkyl ether or $C_1$-$C_{12}$ alkyl ester;

heating the mixture to 75-140° C. under agitation, and then adding 0.1-5% by weight of dibenzoyl peroxide based on the total weight of the monomer (A) and the monomer (B) to initiate polymerization and cross-linking, thereby producing a flexible polymer colloid;

extruding the flexible polymer colloid into a pelletizer to form flexible polymer particles; and directly adding the flexible polymer particles into cold water of 1-15° C. to terminate the polymerization and cross-linking quickly.

In the process of the invention, monomer (A) is preferably cis-butadiene, isobutene, diallyl diethyl malonate, diallyl phthalate, diallyl fumarate, diallyl isophthalate, diallyl maleate, diallyl tetrabromophthalate, or any mixture thereof. In a preferable embodiment, 70~80% of the monomer (A) by weight of the total weight of the monomer (A) and the monomer (B) is included.

An embodiment of the present invention relates to a use of the flexible polymer of the invention in preparing an in-depth flooding fluid diverting agent.

The application of the flexible polymer particles of the present invention will not be influenced in solution with unrestricted inorganic salt content or in solution having less than 2% sodium hydroxide or in solution having less than 15% hydrochloric acid. The stability of the flexible polymer particles of the present invention will not be influenced at temperatures of 200° C. or lower.

The flexible polymer particles provided by the present invention have excellent flexibility, deformability, elasticity and stability. They can be used in nearby wellbore profile control and in-depth profile control, or as an in-depth flooding fluid diverting agent. The flexible polymer particles provided by the present invention can also be applied in water shutoff in high temperature and high salinity production wells; preventing chemical channeling in polymer and ASP (alkali-surfactant-polymer) flooding; temporarily plugging in acidization; huff and puff; and preventing in-depth channeling in steam flooding, loss of circulation control and filtration control, and the like.

DETAILED DESCRIPTION OF THE PREFERRED EMBODIMENTS

EXAMPLE 1

60 kg of diallyl phthalate and 40 kg monomer (B) having the structural formula

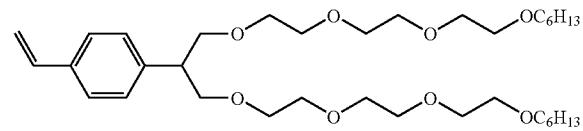

were added into a kneader. The obtained mixture was heated to 85° C. with agitation. Then 1 kg of dibenzoyl peroxide was added to initiate polymerization and cross-linking. A flexible polymer colloid was obtained. The produced flexible polymer colloid was further extruded into a pelletizer and the resulting flexible polymer particles were directly added into cold water (6° C.) to terminate polymerization and cross-linking quickly, thereby obtaining flexible polymer particles with content of about 50% (weight).

EXAMPLE 2

80 kg diallyl phthalate and 20 kg monomer (B) having the structural formula

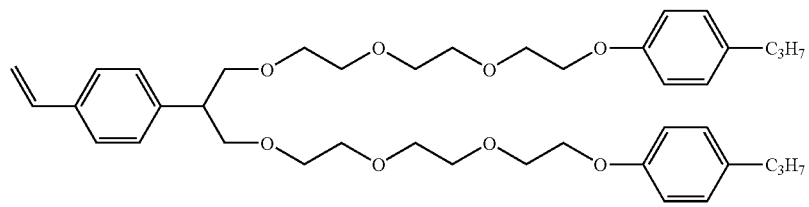

were added into a kneader. The resulting mixture was heated to 140° C. with agitation. Then 5 kg of dibenzoyl peroxide was added to initiate polymerization and cross-linking. A flexible polymer colloid was produced. The produced flexible polymer colloid was extruded into a pelletizer and the resulting flexible polymer particles were directly added into cold water (15° C.) to terminate polymerization and cross-linking quickly, thereby obtaining flexible polymer particles with content of about 50% (weight).

EXAMPLE 3

70 kg diallyl phthalate and 30 kg monomer (B) having the structural formula

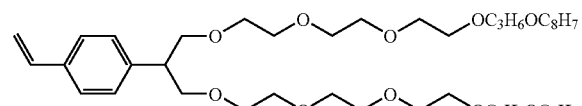

were added into a kneader. The resulting mixture was heated to 100° C. with agitation. Then 2 kg of dibenzoyl peroxide was added to initiate polymerization and cross-linking. A flexible polymer colloid was obtained. The produced flexible polymer colloid was extruded into a pelletizer and the resulting flexible polymer particles were directly added into cold water (8° C.) to terminate polymerization and cross-linking quickly, thereby obtaining flexible polymer particles with content of about 50% (weight).

EXAMPLE 4

85 kg diallyl phthalate and 15 kg monomer (B) having the structural formula

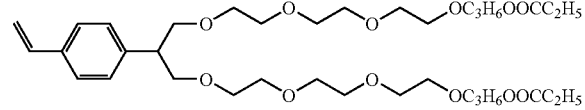

were added into a kneader. The obtained mixture was heated to 120° C. with agitation. Then 4 kg of dibenzoyl peroxide was added to initiate polymerization and cross-linking. A flexible polymer colloid was produced. The produced flexible polymer colloid was extruded into a pelletizer and the resulting flexible polymer particles were directly added into cold water (10° C.) to terminate polymerization and cross-linking quickly, thereby obtaining flexible polymer particles with content of about 50% (weight).

EXAMPLE 5

The flexible polymer particles obtained in Example 1 were used to pass through a tensile testing machine and were subjected to tensile testing at the velocity of 500 mm/min. As can be seen from the test results shown in TABLE 1, the flexible polymer particles showed excellent flexibility, strong resistance to tension, high elongation and powerful deformability.

TABLE 1

| Results of tensile testing | | | |
|---|---|---|---|
| maximum force, g | tear value, g | elongation, % | tensile strength, kPa |
| 120 | 30 | 676.81 | 28.44 |

EXAMPLE 6

The flexible polymer particles obtained in Example 1 were put in simulated injection water in different oilfield reservoir conditions for stability tests. Those reservoir conditions included: 45° C. and a salinity of 4000 mg/L in Daqing oilfield; 70° C. and a salinity of 5700 mg/L in Gudong, Shengli oilfield; 85° C. and a salinity of 19334 mg/L in Shengtuo, Shengli oilfield; 58° C. and a salinity of 5024 mg/L in Gangdong, Dagang oilfield; 73° C. and a salinity of 21636 mg/L in Guan 195, Dagang oilfield; 115° C. and a salinity of 8259 mg/L in Huabei oilfield; and 140° C. and a salinity of 93454 mg/L in Yumen oilfield. After 12 months' aging stability tests, the samples did not deteriorate, which indicated the good stability of the flexible polymer particles.

We claim:

1. A flexible polymer comprising, in copolymerized form, monomer (A) and monomer (B), wherein
   (i) each monomer (A) is a water-insoluble unsaturated diene monomer;
   (ii) each monomer (B) is a compound having the general formula

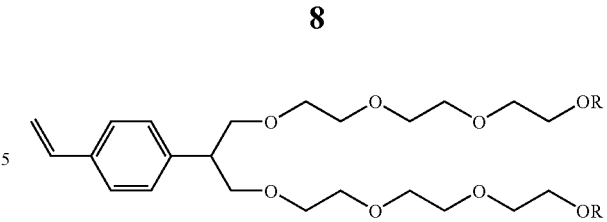

wherein R is $C_1$-$C_{12}$ alkyl, $C_1$-$C_{12}$ alkyl aryl, $C_1$-$C_{12}$ alkyl ether or $C_1$-$C_{12}$ alkyl ester;
   (iii) monomer (A) is in an amount of 60-90% by weight of the total combined weight of monomer (A) and monomer (B);
   (iv) monomer (B) is in an amount of 10-40% by weight of the total combined weight of monomer (A) and monomer (B); and
   (v) each monomer (A) in the polymer is the same as or different than each other monomer (A) in the polymer, and each monomer (B) in the polymer is the same as or different than each other monomer (B) in the polymer.

2. The flexible polymer according to claim 1, wherein monomer (A) is selected from the group consisting of cis-butadiene, isobutene, diallyl diethyl malonate, diallyl phthalate, diallyl fumarate, diallyl isophthalate, diallyl maleate, diallyl tetrabromophthalate, and any mixture thereof.

3. The flexible polymer according to claim 1, wherein monomer (A) is in an amount of 70-80% by weight of the total combined weight of monomer (A) and monomer (B).

4. The flexible polymer according to claim 1, wherein the flexible polymer is in the form of a particle.

5. A process for preparing flexible polymer particles, comprising the steps of:
   (a) combining monomer (A) and monomer (B) in a kneader to form a mixture, wherein (i) each monomer (A) is a water-insoluble unsaturated diene monomer; (ii) each monomer (B) is a compound having the general formula

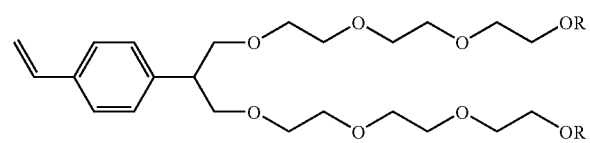

wherein R is $C_1$-$C_{12}$ alkyl, $C_1$-$C_{12}$ alkyl aryl, $C_1$-$C_{12}$ alkyl ether or $C_1$-$C_{12}$ alkyl ester; (iii) monomer (A) is in an amount of 60-90% by weight of the total combined weight of monomer (A) and monomer (B); (iv) monomer (B) is in an amount of 10-40% by weight of the total combined weight of monomer (A) and monomer (B); and (v) each monomer (A) is the same as or different than each other monomer (A), and each monomer (B) is the same as or different than each other monomer (B);
   (b) heating the resulting mixture to 75-140° C. under agitation, and then adding dibenzoyl peroxide in an amount of 0.1-5% by weight based on the total combined weight of monomer (A) and monomer (B) to initiate polymerization and cross-linking, thereby producing a flexible polymer colloid;
   (c) extruding the resulting flexible polymer colloid into a pelletizer to form flexible polymer particles; and
   (d) contacting the flexible polymer particles with cold water at 1-15° C. to terminate the polymerization and cross-linking reactions.

6. The process according to claim 5, wherein monomer (A) is selected from the group consisting of cis-butadiene, isobutene, diallyl diethyl malonate, diallyl phthalate, diallyl fumarate, diallyl isophthalate, diallyl maleate, diallyl tetrabromophthalate, and any mixture thereof.

7. The process according to claim 5, wherein the added amount of monomer (A) is 70-80% by weight of the total combined weight of monomer (A) and monomer (B).

8. A method for diverting in-depth flooding fluid in an oilfield stratum comprising introducing the flexible polymer according to claim 1 into the stratum prior to an oil recovery operation.

* * * * *